US 7,369,353 B1

(12) United States Patent
Gupta et al.

(10) Patent No.: US 7,369,353 B1
(45) Date of Patent: May 6, 2008

(54) APPARATUS FOR TAPE CARTRIDGE RETENTION DURING TRANSPORT

(75) Inventors: Sanjiv K. Gupta, Superior, CO (US); Randal D. Fird, Boulder, CO (US); Roger Grow, Lafayette, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 428 days.

(21) Appl. No.: 11/110,211

(22) Filed: Apr. 20, 2005

(51) Int. Cl.
*G11B 15/68* (2006.01)
(52) U.S. Cl. ...................................... 360/92; 369/30.4
(58) Field of Classification Search ................. 360/92; 369/30.4
See application file for complete search history.

(56) References Cited

U.S. PATENT DOCUMENTS

| 5,247,406 | A | 9/1993 | Apple et al. |
| 5,297,675 | A | 3/1994 | Martucci |
| 5,487,579 | A | 1/1996 | Woodruff |
| 5,659,440 | A | 8/1997 | Acosta et al. |
| 5,927,834 | A | 7/1999 | Todor |
| 6,028,733 | A | 2/2000 | Schmidtke et al. |
| 6,068,436 | A | 5/2000 | Black et al. |
| 6,301,218 | B1 | 10/2001 | Jones |
| 6,454,509 | B1 | 9/2002 | Kappel et al. |
| 6,512,963 | B1 * | 1/2003 | Felde et al. ................. 700/215 |
| 7,253,983 | B2 * | 8/2007 | Starr et al. .................... 360/69 |
| 2004/0190190 | A1 | 9/2004 | Egawa |

\* cited by examiner

*Primary Examiner*—A. J. Heinz
(74) *Attorney, Agent, or Firm*—Brooks Kushman P.C.

(57) ABSTRACT

A tape cartridge transport assembly for moving a tape cartridge between a first library and a second library includes a guide arrangement disposable between the first and second libraries, and a cartridge carrier that is moveable along the guide arrangement. The cartridge carrier includes a carrier body having an opening for receiving the tape cartridge, and a retention device associated with the carrier body. The retention device is engageable with the tape cartridge for retaining the tape cartridge in the carrier body as the cartridge carrier moves along the guide arrangement. The assembly further includes a drive mechanism associated with the cartridge carrier for automatically moving the cartridge carrier along the guide arrangement.

20 Claims, 5 Drawing Sheets

US 7,369,353 B1

APPARATUS FOR TAPE CARTRIDGE RETENTION DURING TRANSPORT

BACKGROUND OF THE INVENTION

Field of the Invention

The invention relates to an apparatus for retaining one or more tape cartridges during transport between libraries.

SUMMARY OF THE INVENTION

Under the invention, a tape cartridge transport assembly for moving a tape cartridge between a first library and a second library is provided. The transport assembly includes a guide arrangement disposable between the first and second libraries, and a cartridge carrier that is moveable along the guide arrangement. The cartridge carrier includes a carrier body having an opening for receiving the tape cartridge, and a retention device associated with the carrier body. The retention device is engageable with the tape cartridge for retaining the tape cartridge in the carrier body as the cartridge carrier moves along the guide arrangement. The assembly further includes a drive mechanism associated with the cartridge carrier for automatically moving the cartridge carrier along the guide arrangement.

Further under the invention, a tape library system is provided. In one embodiment, the system includes a first tape library and a second tape library located proximate the first tape library. The system further includes a tape cartridge transport assembly for moving a tape cartridge between the first tape library and the second tape library. The transport assembly includes a guide body having first and second ends located proximate the first and second tape libraries, respectively, an actuator member on the guide body proximate the first end, and a cartridge carrier that is moveable along the guide body between the first and second libraries. The cartridge carrier includes a carrier body having an opening for receiving the tape cartridge, and a retention device associated with the carrier body. The retention device includes an engaging member that is engageable with the tape cartridge to retain the tape cartridge in the carrier body as the cartridge carrier moves along the guide body, and a release member associated with the engaging member for moving the engaging member. The release member is engageable with the actuator member when the cartridge carrier is moved toward the first end of the guide body to thereby disengage the engaging member from the tape cartridge.

In another embodiment, the system includes a first tape library and a second tape library located proximate the first tape library. The system further includes a tape cartridge transport assembly for moving a tape cartridge between the first tape library and the second tape library. The transport assembly includes a guide body having first and second ends located proximate the first and second tape libraries, respectively, and a cartridge carrier that is moveable along the guide body between the first and second libraries. The cartridge carrier includes a carrier body having an opening for receiving the tape cartridge, and a retention device associated with the carrier body. The retention device includes an engaging member that is engageable with the tape cartridge to retain the tape cartridge in the carrier body as the cartridge carrier moves along the guide body, and an electrically activated release apparatus associated with the engaging member for disengaging the engaging member from the tape cartridge.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
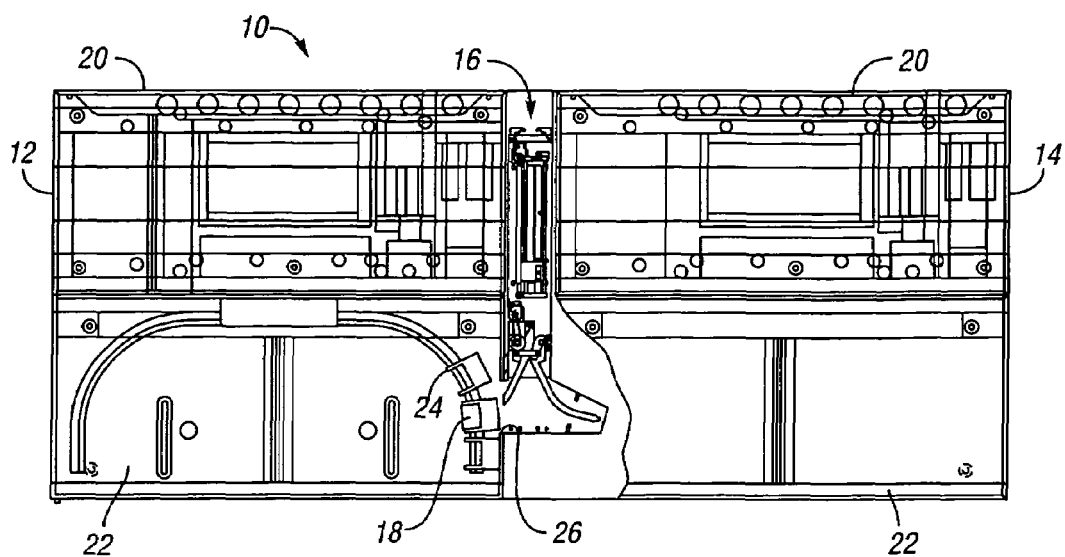
FIG. 1 is a plan view of a tape library system according to the invention including first and second libraries and a tape cartridge transport assembly for transporting tape cartridges between the libraries.

FIG. 1 shows an automated tape library system 10 according to the invention. The system 10 includes multiple automated tape libraries, such as first and second libraries 12 and 14, respectively, that are disposed in close proximity to each to each other, such as adjacent each other. The system 10 further includes a tape cartridge exchange unit or transport assembly 16 for transporting one or more tape cartridges 18 between the libraries 12 and 14.

Each library 12 and 14 may have any suitable configuration. For example, each library 12 and 14 may include a tape drive/electronics frame assembly 20 that supports one or more tape drives, and a base storage frame assembly 22 that supports multiple cartridge arrays 24. Although only cartridge array 24 is shown in FIG. 1 for illustrative purposes, it should be understood that each library 12 and 14 may include multiple cartridge arrays 24 arranged vertically and/or along side each other. For example, if library system 10 is to be implemented as an SL8500 Modular Tape Library, then libraries 12 and 14 can be implemented as substantially identical automated tape library units or modules that each have multiple cartridge arrays arranged in a vertical relationship. Each library 12 and 14 also includes one or more pass-through ports 26 for receiving the cartridge transport assembly 16. Although only one pass-through port 26 is shown in FIG. 1, it should be understood that each library 12 and 14 may include multiple pass-through ports 26, and that the pass-through ports 26 of library 12 may be arranged adjacent to the pass-through ports 26 of library 14.

Those of ordinary skill in the art will appreciate that the hardware depicted in FIG. 1 may vary. For example, library 12 may be structured differently (e.g., internally or externally) from library 14. In any event, libraries 12 and 14 should be sufficiently structurally and/or functionally compatible with each other to the extent that cartridge transport assembly 16 can transport and exchange tape cartridges 18 between library 12 and library 14 (e.g., via one or more pass-through ports 26 of library 12 and one or more counterpart pass-through ports 26 of library 14).

Figure 2:
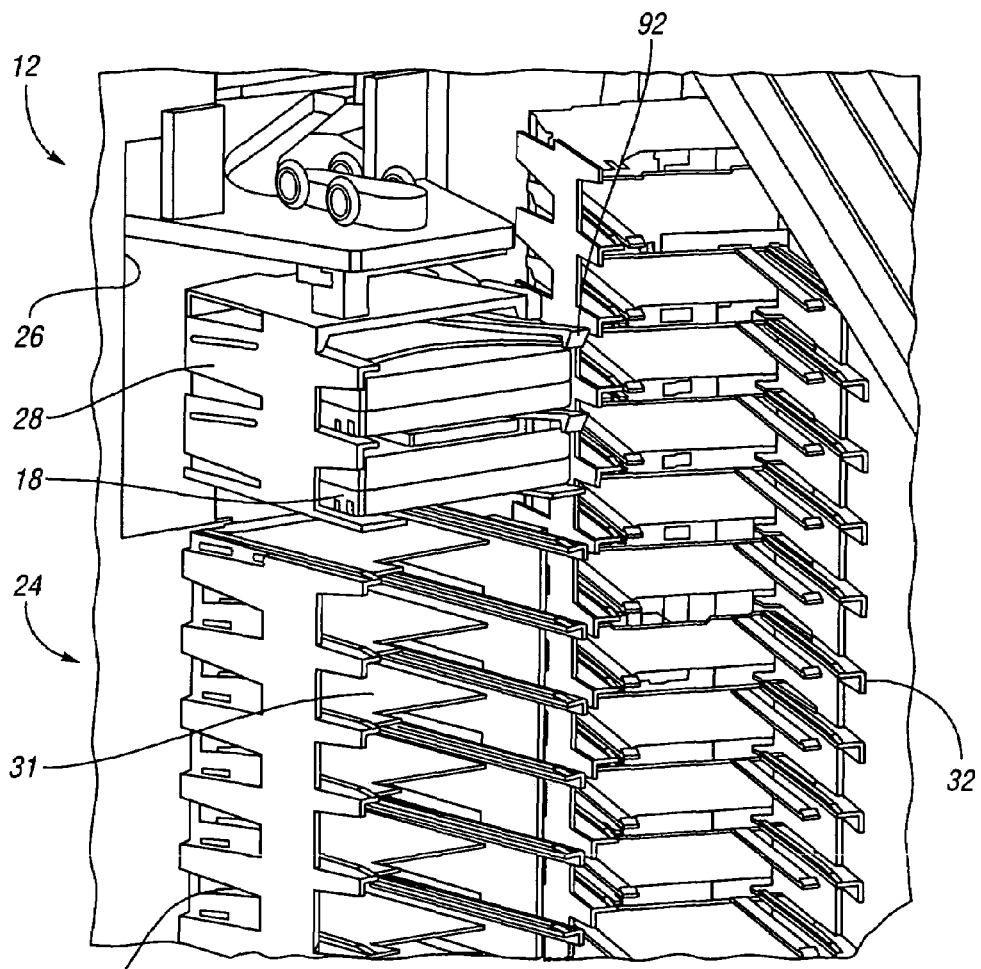
FIG. 2 is a fragmentary perspective view of the first library showing a cartridge carrier of the cartridge transport assembly extending through a pass-through port of the first library.

Referring now to FIG. 2, for illustrative purposes, a perspective view of one cartridge array 24 and pass-through port 26 of library 12 is depicted. This view may also be used to illustrate the general structure and arrangement of each cartridge array 24 and pass-through port 26 of library 12 and library 14.

As shown in FIG. 2, pass-through port 26 extends through a sidewall of library 12. For example, pass-through port 26 may be a generally rectangular opening formed in the sidewall of library 12. Referring also to FIG. 1, note that cartridge transport assembly 16 protrudes or "passes through" respective sidewalls of libraries 12 and 14. Similarly, additional cartridge transport assemblies (not shown) may be envisioned protruding through additional pass-through ports (not shown) of library 12 and adjacent counterpart pass-through ports (not shown) of library 14.

Cartridge magazine or carrier 28 of cartridge transport assembly 16 is positioned in and preferably protrudes through pass-through port 26. Array section 30 (e.g., component of cartridge array 24) is located adjacent and below pass-through port 26 and cartridge carrier 28 (e.g., whenever cartridge transport assembly 16 positions cartridge carrier 28 in pass-through port 26). For example, in an SL8500 library environment, array section 30 is an abbreviated section (e.g., reduced height section to allow for cartridge carrier 28) that can include multiple cells or slots 31 for cartridge storage. Also, cartridge array section 32 is located adjacent to cartridge carrier 28 and array section 30. As such, any of the active cells or slots of cartridge carrier 28 and array sections 30 and 32 can be accessed for retrieval and storage by a robot mechanism (not shown) of library 12. Those of ordinary skill in the art should appreciate that a similar arrangement of a cartridge carrier and adjacent array sections is also available for use in conjunction with a robot mechanism of library 14.

Figure 3:
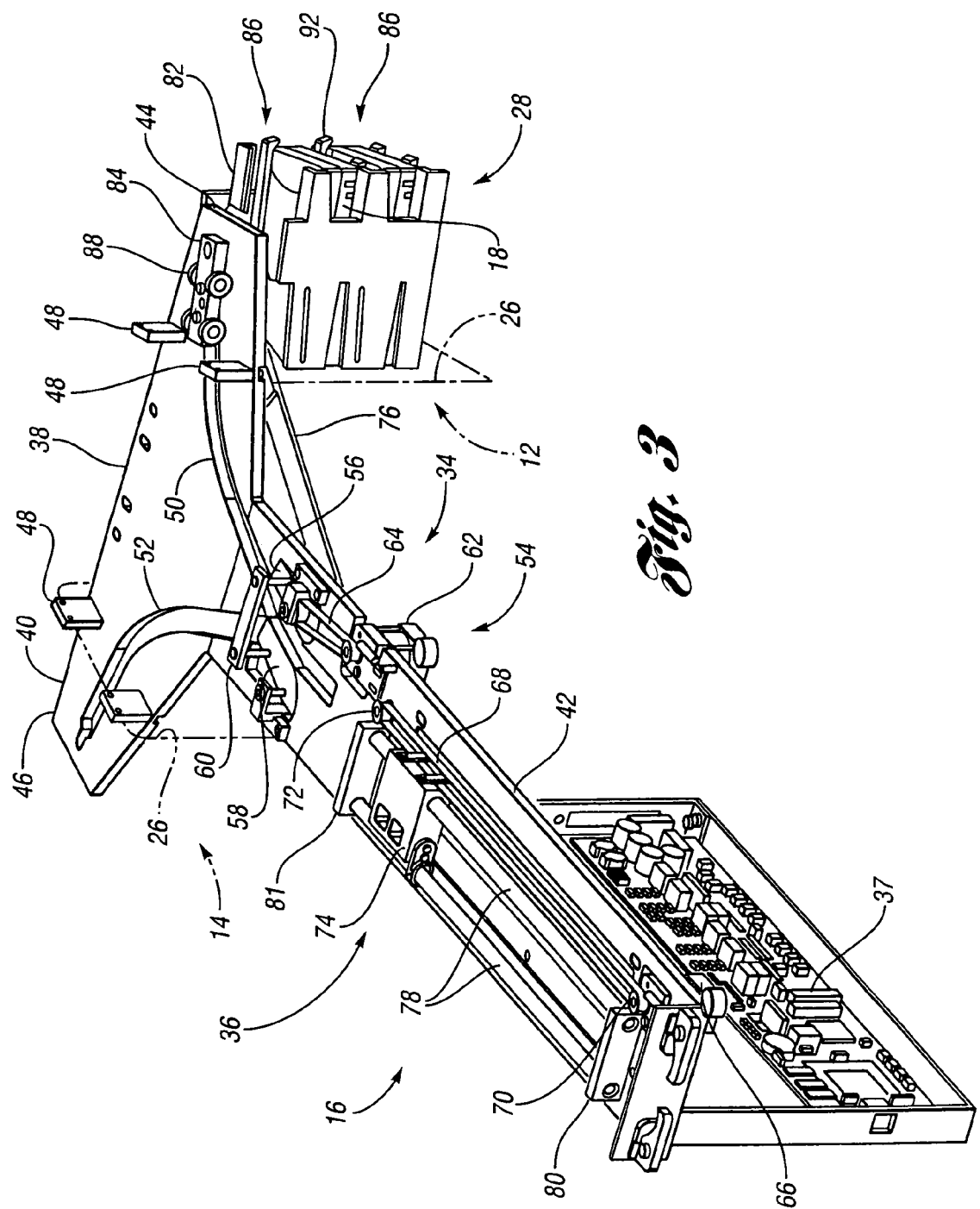
FIG. 3 is a perspective view of the cartridge transport assembly showing the cartridge carrier positioned at one end of a guide body of the cartridge transport assembly.

Referring now to FIG. 3, the cartridge transport assembly 16 will now be more fully described. While the cartridge transport assembly 16 may have any suitable configuration for transporting tape cartridges 18, in the embodiment shown in FIG. 3, the cartridge transport assembly 16 includes a guide arrangement 34 for guiding movement of the cartridge carrier 28 between the libraries 12 and 14, a drive mechanism 36 associated with the cartridge carrier 28 for automatically moving the cartridge carrier 28 along the guide arrangement 34, and a controller 37 for controlling operation of the cartridge transport assembly 16.

The guide arrangement 34 includes a guide body 38 having an end cam 40 and a main body 42 connected together, such as with bolts. The end cam 40 has first and second ends 44 and 46, respectively, that are configured to extend into the first and second libraries 12 and 14, respectively, through corresponding pass-through ports 26 (shown in phantom lines in FIG. 3). The end cam 40 may also include multiple mounting blocks 48 for attaching the cartridge transport assembly 16 to sidewalls of the libraries 12 and 14. Moreover, the end cam 40 includes first and second tracks 50 and 52, respectively, for guiding movement of the cartridge carrier 28, as explained below in detail.

The guide arrangement 34 further includes a switching mechanism 54 attached to the guide body 38 for switching the cartridge carrier 28 between the first and second tracks 50 and 52, respectively. The switching mechanism 54 includes first and second switch levers 56 and 58 pivotally connected to guide body 38. The levers 56 and 58 are connected to switch linkage 60, which is coupled to bi-directional switch motor 62 via switch belt 64. Therefore, switch linkage 60 translates a clockwise rotation of switch motor 62 to a clockwise rotation of switch levers 56 and 58. Similarly, switch linkage 60 translates a counter-clockwise rotation of switch motor 62 to a counter-clockwise rotation of switch levers 56 and 58. Thus, a clockwise rotation of switch motor 62 can position switch levers 56 and 58 so as to "close" second track 52 and "open" first track 50 for movement of cartridge carrier 28 along first track 50, as shown in FIG. 3. Conversely, a counter-clockwise rotation of switch motor 62 positions switch levers 56 and 58 so as to "open" second track 52 and "close" first track 50 for movement of cartridge carrier 28 along second track 52, as shown in FIG. 4.

Returning to FIG. 3, drive mechanism 36 may have any suitable configuration for moving cartridge carrier 28 along guide arrangement 34. In the embodiment shown in FIG. 3, for example, drive mechanism 36 includes a drive motor 66 coupled to a drive belt 68, which extends between motor pulley 70 and idler pulley 72. The drive belt 68 is connected to drive carriage 74, which is coupled to cartridge carrier 28 with link arm 76. The drive carriage 74 is slidable along a pair of rails 78 that extend between first and second end plates 80 and 81, respectively, mounted on main body 42. With the configuration described above, drive belt 68 can translate a rotational force from drive motor 66 to a linear force at drive carriage 74 in order to position drive carriage 74 in a linear direction along rails 78. For this exemplary embodiment, a clockwise rotation of drive motor 66 causes drive carriage 74 to move in a line towards end cam 40. Conversely, a counter-clockwise rotation of drive motor 66 causes drive carriage 74 to move in a linear direction away from end cam 40. Link arm 76 functions to synchronize the movement of cartridge carrier 28 with that of drive carriage 74 (e.g., drive carriage 74 drives cartridge carrier 28).

Controller 37 may include necessary circuitry for controlling operation of the cartridge transport assembly 16 to thereby control movement of the cartridge carrier 28. More specifically, controller 37 may be electrically connected to motors 62 and 66 so as to control operation of the switching mechanism 54 and drive mechanism 36. Furthermore, controller 37 may also be in communication with controllers of the libraries 12 and/or 14.

Figure 4:
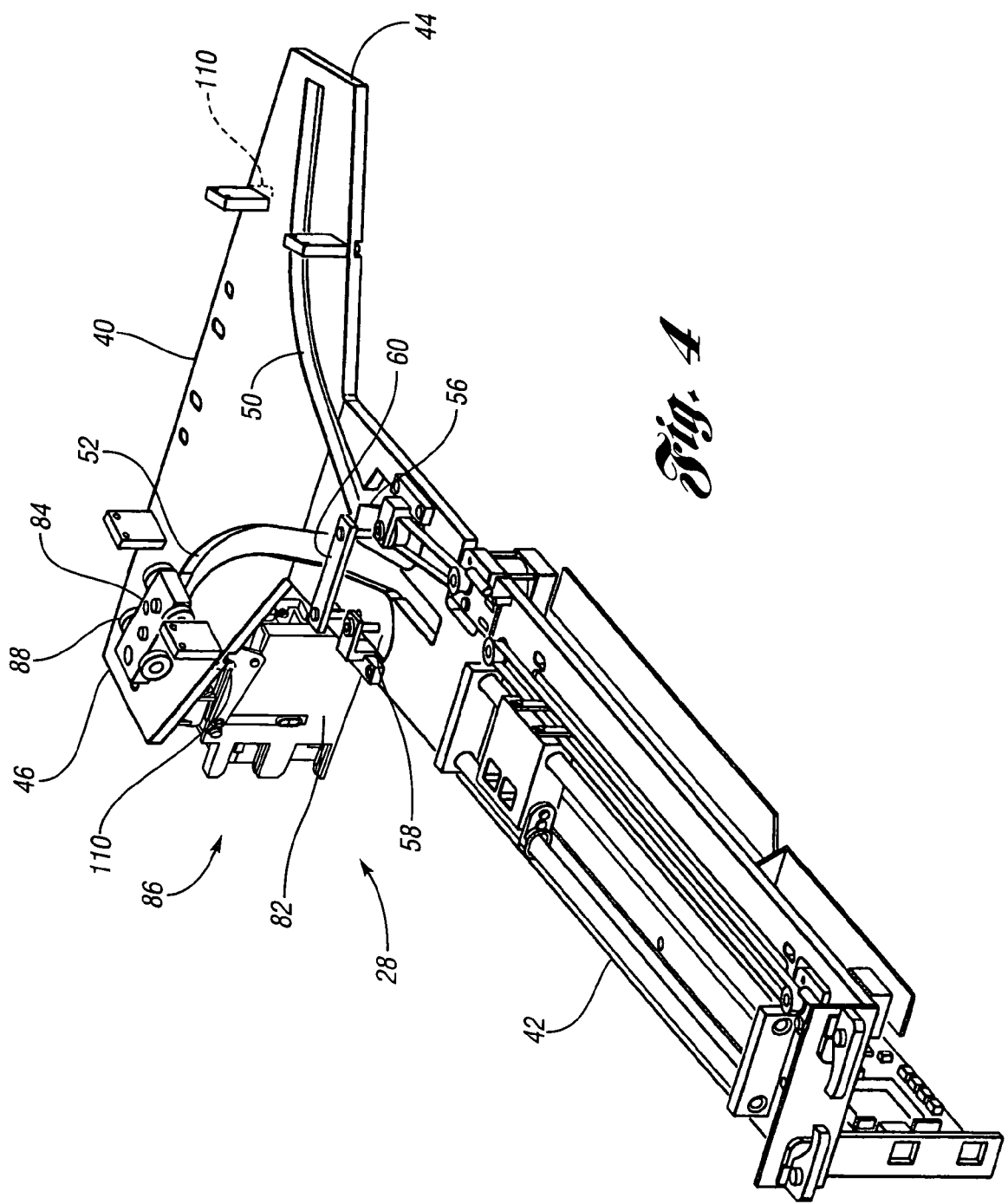
FIG. 4 is a perspective view of the cartridge transport assembly showing the cartridge carrier positioned at another end of the guide body of the cartridge transport assembly.

Referring to FIGS. 3 and 4, cartridge carrier 28 includes a carrier body 82 connected to a cartridge carriage 84, and the carrier body 82 has one or more openings or slots 86 for receiving one or more tape cartridges 18. In the embodiment shown in FIGS. 3 and 4, for example, the carrier body 82 includes two slots 86. The cartridge carriage 84 is configured to ride on top of the guide body 38, and includes a set of rollers or wheels 88 to facilitate movement of the cartridge carriage 84 along the tracks 50 and 52.

Referring to FIGS. 3-6, the cartridge carrier 28 also includes a retention device 90 associated with the carrier body 82 for retaining tape cartridges 18 in the carrier body 82 as the cartridge carrier 28 moves along the tracks 50 and 52. The retention device 90 includes one or more engaging members 92, such as hooks, that are each engageable with a tape cartridge 18 to retain the tape cartridge 18 in a respective slot 86, and a release member 94 associated with the engaging members 92 for moving the engaging members 92 away from the tape cartridges 18. In the embodiment shown in FIG. 5, the engaging members 92 are pivotally connected to the carrier body 82, and are urged into engagement with the tape cartridges 18 by spring members 96. More specifically, in the embodiment shown in FIG. 5, the engaging members 92 are pivotally connected to a rear portion of the carrier body 82, and the spring members 96 extend between the rear portion and a main portion of the carrier body 82. Furthermore, each engaging member 92 is configured to engage a front surface 98 of a respective tape cartridge 18. As a result, the cartridge carrier 28 may be configured for use with multiple different sizes and shapes of tape cartridges 18.

Alternatively, the engaging members 92 may be configured to engage any suitable portion of a respective tape cartridge 18. For example, each engaging member 92 may engage a notch or recess formed in a side portion of a respective tape cartridge 18. As another example, each engaging member 92 may contact any suitable surface of a respective tape cartridge 18 and retain the tape cartridge in place via friction.

Figure 5:
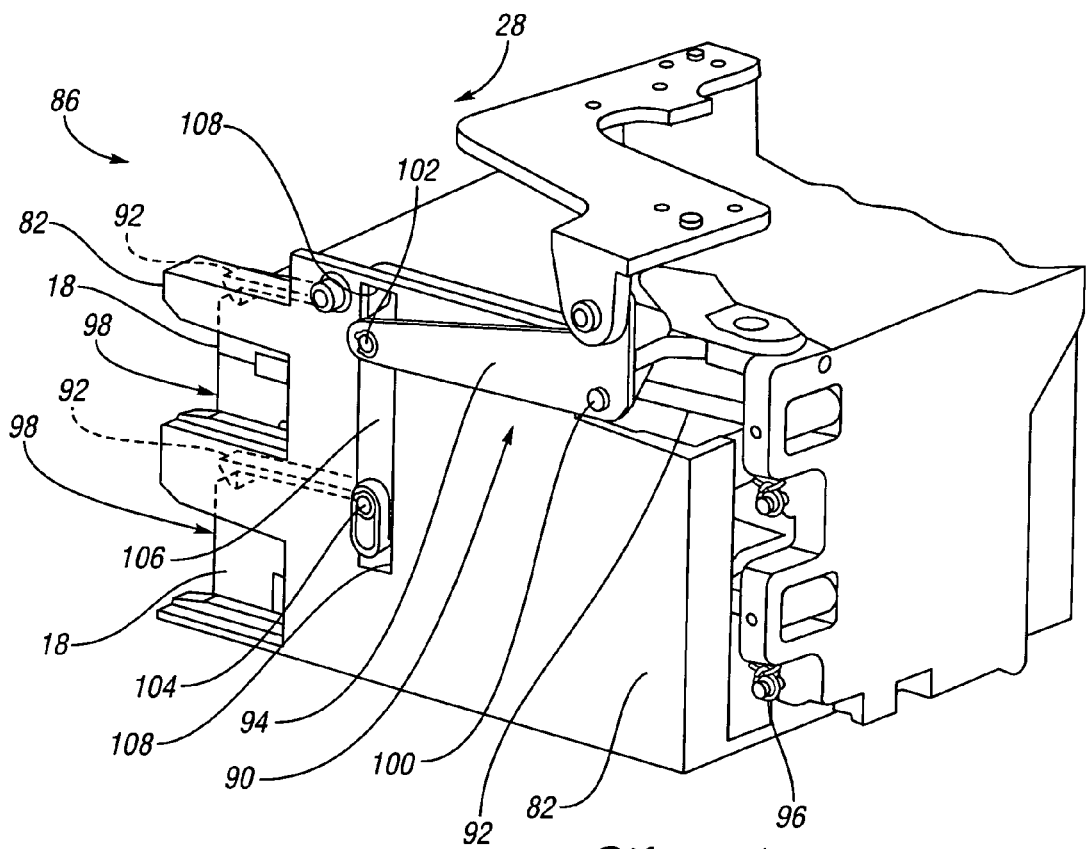
FIG. 5 is a perspective view of the cartridge carrier showing a retention device of the cartridge carrier in a retaining position for retaining tape cartridges in the cartridge carrier.

In the embodiment shown in FIG. 5, the release member 94 is configured as a pivot arm that is pivotally coupled to the carrier body 82 at pivot point 100. Furthermore, the release member 94 may be directly or indirectly connected to the engaging members 92. In one embodiment, for example, the release member 94 is directly connected to a projection 102 of one engaging member 92, and is indirectly connected to a projection 104 of another engaging members 92 through link member 106. The carrier body 82 may also be provided with a slot or opening 108 for allowing movement of the link member 106 as the release member 94 pivots.

Figure 6:
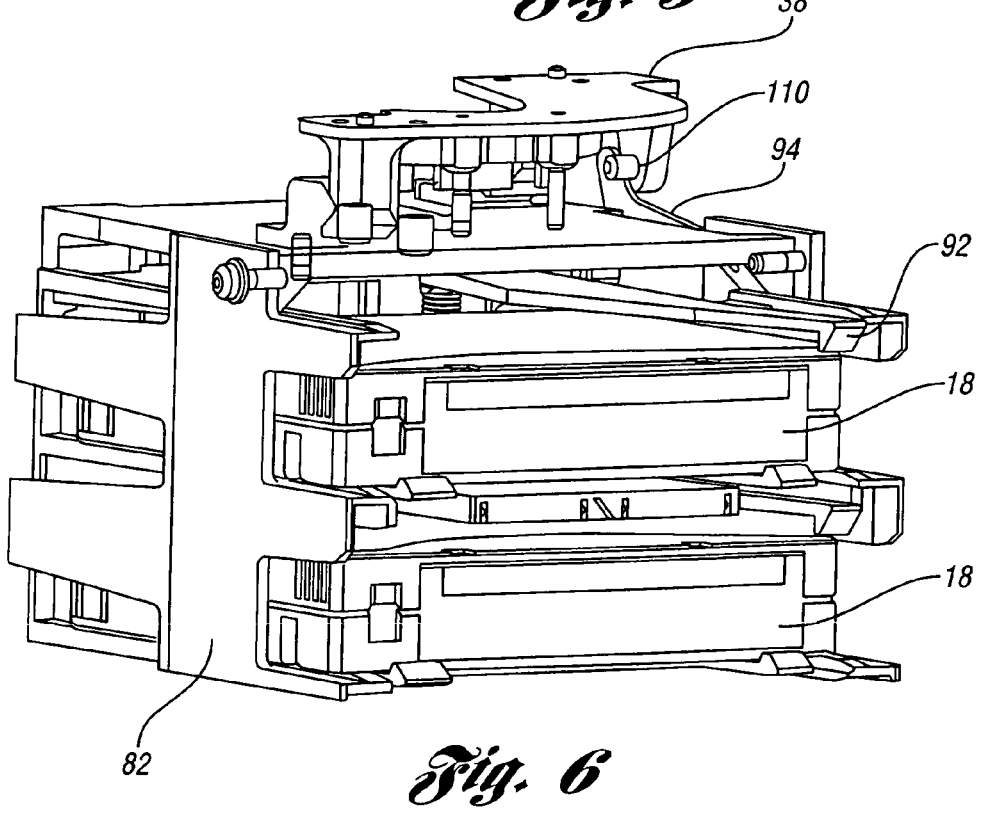
FIG. 6 is a perspective view of the cartridge carrier showing the retention device in a release position.

The release member 94 may be actuated in any suitable manner to disengage the engaging members 92 from the tape cartridges 18. Referring to FIGS. 4 and 5, for example, the guide arrangement 34 may include an actuator member, such as a release pin 110, proximate each end 44, 46 of the end cam 40. As the cartridge carrier 28 moves toward an end 44 or 46 of the end cam 40, the release member 94 engages the release pin 110, which causes the release member 94 to pivot rearwardly and raise the engaging members 92, as shown in FIG. 6. When the cartridge carrier 28 moves away from a respective end 44 or 46 of the end cam 40, the release member 94 disengages the release pin 110, and the spring members 96 urge the engaging members 92 into engagement with the tape cartridges 18, as shown in FIG. 5. Thus, the retention device 90 provides automatic, positive retention of tape cartridges 18 in the cartridge carrier 28 as the cartridge carrier 28 moves between libraries 12 and 14.

Referring to FIGS. 3-6, operation of the system 10 will now be described. In an exemplary operation, a controller subsystem of one library 12 or 14 initiates a pass-through operation to exchange one or more tape cartridges 18 from one library to the other library. Assuming, for illustrative purposes, that cartridge carrier 28 is initially positioned in a pass-through port 26 of library 12, and a robotic "hand" of library 12 places a tape cartridge 18 into a slot 86 of cartridge carrier 28 such that front surface 98 of the tape cartridge 18 faces outwardly. Controller 37 then sends an appropriate drive signal to drive motor 66 that causes drive motor 66 to rotate in either a clockwise or counter-clockwise direction. In response, drive motor 66 rotates in a selected direction and thereby moves drive belt 68 accordingly. In turn, drive belt 68 "pulls" or "pushes" drive carriage 74 along rails 78 (e.g., toward or away from first end plate 80 dependent upon the rotational direction of drive motor 66). Link arm 76 transfers the movement of drive carriage 74 to cartridge carrier 28.

For this example, in order to transport one or more tape cartridges 18 from library 12 to library 14, controller 37 causes drive motor 66 to rotate counter-clockwise so as to "pull" cartridge carrier 28 along first track 50 and away from the pass-through port of library 12. As cartridge carrier 28 moves away from the pass-through port of library 12, the release member 94 disengages the release pin 110, which allows the engaging members 92 to engage the tape cartridges 18.

The drive mechanism 36 continues to pull the cartridge carrier 28 until the cartridge carrier 28 reaches a "neutral" position (e.g., a location below the point of convergence of tracks 50 and 52 in FIG. 3). Placing cartridge carrier 28 in this "neutral" position allows unimpeded movement of switch levers 56 and 58. Controller 37 then sends an appropriate drive signal to switch motor 62, which causes (for this example) switch motor 62 to rotate in a counter-clockwise direction. Switch belt 64 transfers the rotational force from switch motor 62 to switch link 60. For this example, this particular switching operation "closes" first track 50 and "opens" second track 52 for travel by cartridge carrier 28. Clearly, an opposite switching operation would "open" first track 50 for travel by cartridge carrier 28, and "close" second track 52.

Controller 37 then sends an appropriate drive signal to drive motor 66 to cause drive motor 66 to rotate (for this example) in a clockwise direction. This rotational force is transferred by drive belt 68 to drive carriage 74, which "pushes" drive carriage 74 forward and along rails 78 away from first end plate 80. Link arm 76 rotates in a counter-clockwise direction and transfers the movement of drive carriage 74 to cartridge carrier 28. Cartridge carrier 28 is driven along second track 52 and thereby moves carrier body 82 to the pass-through port of library 14. As the cartridge carrier 28 approaches the pass-through port, the release member 94 engages the release pin 110 disposed on the end cam 40 proximate the second end 46. As a result, the release member 94 is pivoted to the release position, thereby disengaging the engaging members 92 from the tape cartridges 18. A robotic "hand" of library 14 can then retrieve the one or more cartridges stored in cartridge carrier 28.

Figure 7:
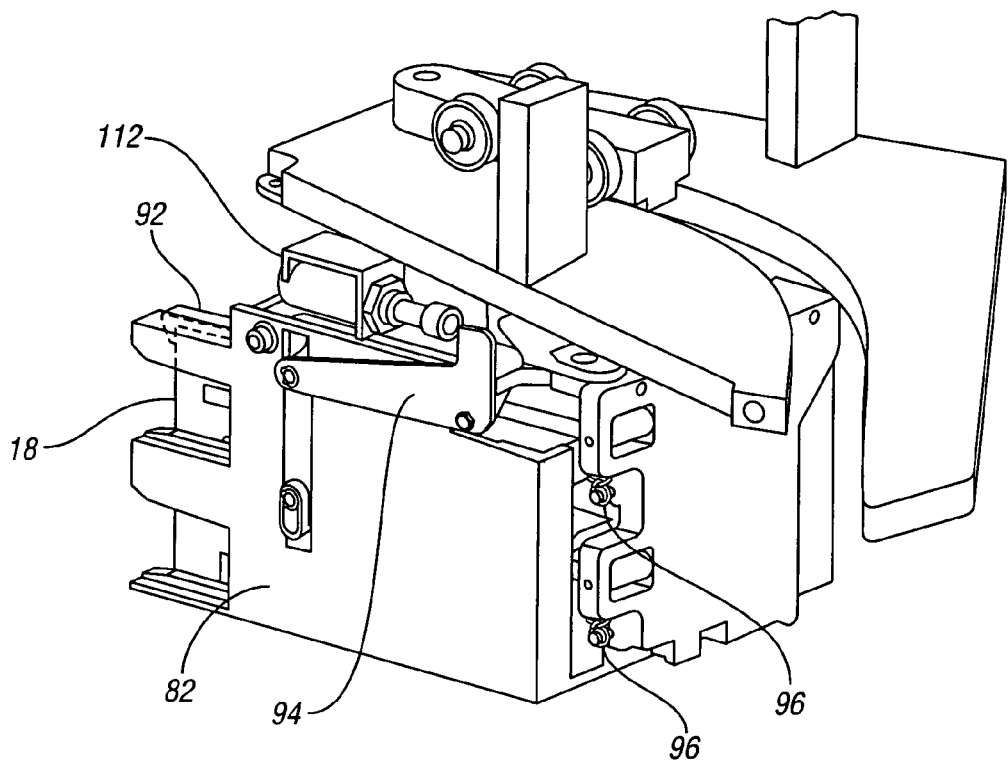
FIG. 7 is a perspective view of a second embodiment of the cartridge carrier showing an alternative actuator member for releasing the retention device, wherein the retention device is shown in a retaining position for retaining tape cartridges in the cartridge carrier.
Figure 8:
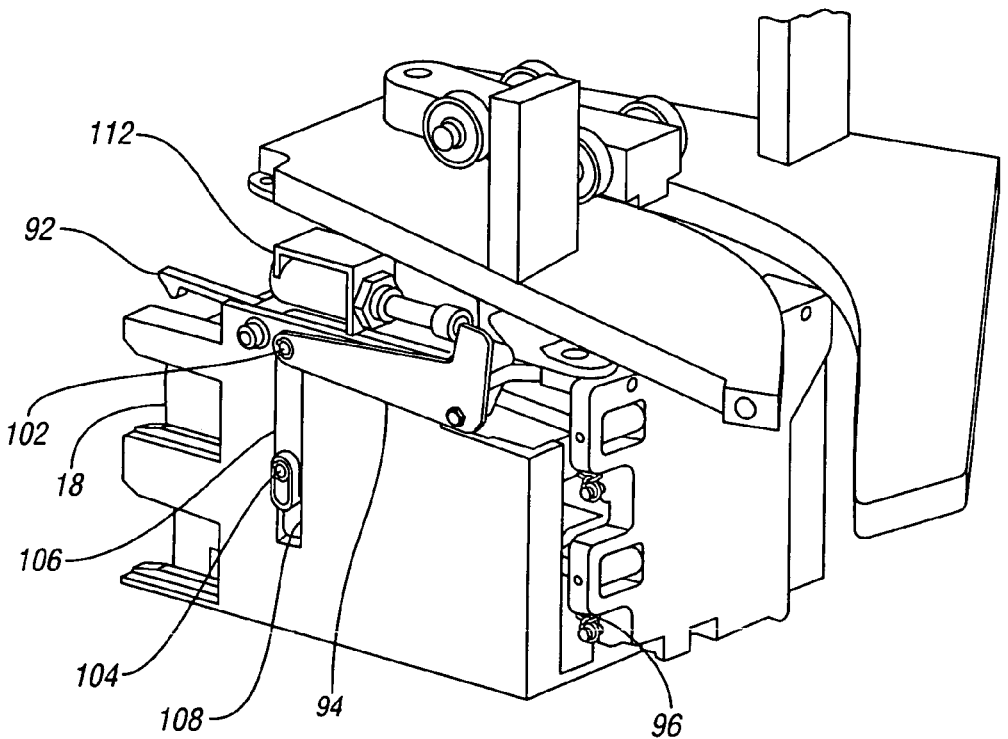
FIG. 8 is a perspective view of the cartridge carrier of FIG. 7 showing the retention device in a release position.

FIGS. 8 and 9 show an alternative embodiment of an actuator member for actuating the release member 94. In FIGS. 8 and 9, the actuator member is configured as an electrically activated release apparatus 112, such as a motor or solenoid, that is mounted on the carrier body 82. The release apparatus 112 may be electrically connected to the controller 37 such as with a cable, and is operable to move the release member 94 from a retaining position, shown in FIG. 7, to a release position, shown in FIG. 8. With this configuration, the release apparatus 112 may be used to automatically move each engaging member 92 from a retaining position, for engaging a tape cartridge, and a release position as the cartridge body 82 is moved toward either end of the guide arrangement 34. Furthermore, the release apparatus 112 may be used to move the engaging members 92 between the retaining positions and the release positions no matter where the cartridge carrier 28 is positioned along the guide arrangement 34.

Although the release apparatus 112 is shown as a linear device, the release apparatus 112 may move in any suitable manner. For example, the release apparatus 112 may be a rotatable motor or solenoid having a cam mounted on a rotatable shaft. As the shaft rotates, the cam may engage the release member 94 and move the release member 94 from the retaining position to the release position.

Additional details of the cartridge transport assembly 16 may be found in co-pending application Ser. No. 10/790,608, filed on Mar. 1, 2004, which is hereby incorporated by reference in its entirety. Furthermore, it is to be understood that the retention device described above may be used with any suitable cartridge transport assembly that is configured to move one or more tape cartridges along a guide arrangement from one library to another library.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape cartridge transport assembly for moving a tape cartridge between a first library and a second library, the transport assembly comprising:
    a guide arrangement disposable between the first and second libraries;
    a cartridge carrier that is moveable along the guide arrangement, the cartridge carrier including a carrier body having an opening for receiving the tape cartridge, and a retention device associated with the carrier body, the retention device being engageable with the tape cartridge for retaining the tape cartridge in the carrier body as the cartridge carrier moves along the guide arrangement; and
    a drive mechanism associated with the cartridge carrier for automatically moving the cartridge carrier along the guide arrangement;
    wherein the carrier body is configured to receive the tape cartridge such that a front surface of the tape cartridge faces outwardly when the tape cartridge is received in the carrier body, and the retention device is configured to engage the front surface of the tape cartridge.

2. The assembly of claim 1 wherein the retention device includes an engaging member that is engageable with the tape cartridge, and a release member that is pivotable with respect to the carrier body and associated with the engaging member for disengaging the engaging member from the tape cartridge.

3. The assembly of claim 1 wherein the retention device includes an engaging member that is engageable with the tape cartridge, and an electrically activated release apparatus associated with the engaging member for disengaging the engaging member from the tape cartridge.

4. The assembly of claim 1 wherein the guide arrangement includes a guide body having first and second ends disposable proximate the first and second libraries, respectively, and a first actuator member disposed proximate the first end of the guide body, and wherein the retention device includes an engaging member that is engageable with the tape cartridge, and a release member associated with the engaging member for moving the engaging member, the release member being engageable with the first actuator member when the cartridge carrier is moved toward the first end of the guide body to thereby disengage the engaging member from the tape cartridge.

5. The assembly of claim 4 wherein the guide arrangement further includes a second actuator member disposed proximate the second end of the guide body, and the release member of the cartridge carrier is engageable with the second actuator member of the guide arrangement when the cartridge carrier is moved toward the second end of the guide body to thereby disengage the engaging member from the tape cartridge.

6. The assembly of claim 4 wherein the first actuator member extends below the guide body, and the release member extends above the carrier body.

7. The assembly of claim 1 wherein the retention device includes an engaging member that is engageable with the tape cartridge, and the assembly further includes an actuator member associated with the engaging member for automatically disengaging the engaging member from the tape cartridge.

8. The assembly of claim 1 wherein the guide arrangement includes a guide body having first and second tracks, and the cartridge carrier is moveable along the tracks.

9. The assembly of claim 8 wherein the guide arrangement further includes a switching mechanism associated with the guide body for allowing the cartridge carrier to switch between the first and second tracks.

10. A tape library system comprising:
    a first tape library;
    a second tape library located proximate the first tape library; and
    a tape cartridge transport assembly for moving a tape cartridge between the first tape library and the second tape library, the transport assembly including a guide body having first and second ends located proximate the first and second tape libraries, respectively, an actuator member on the guide body proximate the first end, and a cartridge carrier that is moveable along the guide body between the first and second libraries, the cartridge carrier including a carrier body having an opening for receiving the tape cartridge, and a retention device associated with the carrier body, the retention device including an engaging member that is engageable with the tape cartridge to retain the tape cartridge in the carrier body as the cartridge carrier moves along the guide body, and a release member associated with the engaging member for moving the engaging member, the release member being engageable with the actuator member when the cartridge carrier is moved toward the first end of the guide body to thereby disengage the engaging member from the tape cartridge.

11. The system of claim 10 wherein the carrier body is configured to receive the tape cartridge such that a front surface of the tape cartridge faces outwardly when the tape cartridge is received in the carrier body, and the engaging member is engageable with the front surface of the tape cartridge.

12. The system of claim 10 wherein the cartridge carrier further comprises a biasing member associated with the engaging member for urging the engaging member into engagement with the tape cartridge, and wherein the release member is configured to disengage the actuator member when the cartridge carrier is moved away from the first end of the guide body to thereby allow the engaging member to engage the tape cartridge.

13. The system of claim 10 wherein the guide body includes first and second tracks, and the cartridge carrier is moveable along the tracks, and the transport assembly further includes a drive mechanism associated with the cartridge carrier for automatically moving the cartridge carrier along the tracks, and a switching mechanism associated with the guide body for allowing the cartridge carrier to switch between the first and second tracks.

14. The system of claim 10 wherein the transport assembly further includes a second actuator member disposed proximate the second end of the guide body, and wherein the release member of the cartridge carrier is engageable with the second actuator member when the cartridge carrier is moved toward the second end of the guide body to thereby disengage the engaging member from the tape cartridge, and the release member is disengageable from the second actuator member when the cartridge carrier is moved away from the second end of the guide body to thereby allow the engaging member to engage the tape cartridge.

15. A tape library system comprising:
- a first tape library;
- a second tape library located proximate the first tape library; and
- a tape cartridge transport assembly for moving a tape cartridge between the first tape library and the second tape library, the transport assembly including a guide body having first and second portions located proximate the first and second tape libraries, respectively, and a cartridge carrier that is moveable along the guide body between the first and second libraries, the cartridge carrier including a carrier body having an opening for receiving the tape cartridge, and a retention device associated with the carrier body, the retention device including an engaging member that is engageable with the tape cartridge to retain the tape cartridge in the carrier body as the cartridge carrier moves along the guide body, wherein the carrier body is configured to receive the tape cartridge such that a front surface of the tape cartridge faces outwardly when the tape cartridge is received in the carrier body and the engaging member is engageable with the front surface of the tape cartridge.

16. The system of claim 15 further comprising an electrically activated release apparatus associated with the engaging member for disengaging the engaging member from the tape cartridge.

17. The system of claim 16 wherein the release apparatus comprises a solenoid.

18. The system of claim 16 wherein the release apparatus comprises a motor.

19. The system of claim 15 wherein the first tape library and the second tape library each include a pass-through port for receiving the cartridge carrier.

20. The system of claim 15 wherein the guide body includes first and second tracks, and the cartridge carrier is moveable along the tracks, and the transport assembly further includes a drive mechanism associated with the cartridge carrier for automatically moving the cartridge carrier along the tracks, and a switching mechanism associated with the guide body for allowing the cartridge carrier to switch between the first and second tracks.

* * * * *